United States Patent [19]

Hohokabe et al.

[11] 4,342,863

[45] Aug. 3, 1982

[54] PLASTIC LENS

[75] Inventors: Yorikatsu Hohokabe, Tokyo; Eiichiro Takiyama, Kamakura, both of Japan

[73] Assignees: Showa Denko K.K.; Showa Highpolymer Co., Ltd., both of Japan

[21] Appl. No.: 233,765

[22] Filed: Feb. 12, 1981

[30] Foreign Application Priority Data

Feb. 19, 1980 [JP] Japan .................................. 55/18490

[51] Int. Cl.³ .............................................. C08G 75/00
[52] U.S. Cl. ..................................... 528/360; 526/286; 526/315; 528/246; 528/364; 350/409
[58] Field of Search ....................... 528/246, 360, 364; 526/286, 315; 350/409

[56] References Cited

U.S. PATENT DOCUMENTS 4,081,591  3/1978  Takiyama et al. .................. 528/246
4,225,698  9/1980  Medem et al. ...................... 350/409

*Primary Examiner*—Maurice J. Welsh
*Attorney, Agent, or Firm*—Wenderoth, Lind & Ponack

[57] ABSTRACT

A plastic lens composed of a cured product of a mixture or a reaction produce of (A) a compound containing at least 2 unsaturated cycloacetal groups per molecule, (B) a compound containing at least 2 mercapto groups per molecule and (D) an aliphatic polyvinyl compound selected from the group consisting of ethylene glycol diacrylate, ethylene glycol dimethacrylate, trimethylolpropane triacrylate, trimethylolpropane trimethacrylate, pentaerythritol tetraacrylate and dipentaerythritol hexaacrylate.

2 Claims, No Drawings

PLASTIC LENS

This invention relates to a plastic lens having excellent optical properties, surface hardness, impact resistance, solvent resistance and scratch resistance. More specifically, it pertains to a plastic lens composed of a cured product of a mixture or a reaction product of (A) a compound containing at least 2 unsaturated cycloacetal groups per molecule with (B) a compound containing at least 2 mercapto groups per molecule or (C) an unsaturated alcohol having a hydroxyl group and an acryloyl or methacryloyl group in the molecule.

Generally, plastic lenses made from conventional plastic materials such as polycarbonate, poly(methyl methacrylate) and poly(allyl diglycol carbonate) are lighter in weight, higher in impact resistance and lower in cost, and can be produced more rapidly, than conventional glass lenses; and because of this superiority, have found extensive use in eyeglasses, cameras, telescopes, etc. Nevertheless, they generally have much lower surface hardness than glass lenses, and this causes the defect that by contact or collision with another object or by scratching, their surfaces are susceptible to damages which will result in impaired esthetic appearances and markedly degraded optical properties.

Various attempts have been made heretofore at removing such a defect or plastic lenses. For example, there is known a method which comprises coating the surface of a plastic lens with a silica-type glass material for vacuum deposition, a silicone compound or a melamine compound and then curing the coating to form a film having improved surface hardness. The plastic lens so produced, however, still has various defects. For example, the extent of improvement achieved of its surface hardness is not entirely satisfactory. The adhesion between the coated film and the plastic lens substrate is poor, and cracking is liable to occur in the interface, especially at high temperature and humidities. Furthermore, because the refractive indexes of the coated film and the plastic lens substrate greatly differ from each other at the interface between them, the transmittance of light decreases and an optical strain tends to occur. Another disadvantage is that it is difficult to adjust the viscosity of the coating agent or control the coating conditions for formation of a uniform coated film, and consequently, the cost rises or the efficiency of production is reduced.

It is an object of this invention to remedy these defects of the conventional plastic lenses.

This object is achieved in accordance with this invention by a plastic lens composed of a cured product of a mixture or a reaction product of (A) a compound containing at least 2 unsaturated cycloacetal groups per molecule with (B) a compound containing at least 2 mercapto groups per molecule or (C) an unsaturated alcohol having a hydroxyl group and an acryloyl or methacryloyl group in the molecule. The plastic lens of this invention has high surface hardness and superior abrasion resistance, scratch resistance, heat resistance, chemical resistance, impact resistance, light transmission and dyeability, and exhibits very good cutting and polishing properties during processing.

The compound (A) containing at least 2 unsaturated cycloacetal groups per molecule is an unsaturated cycloacetal compound containing at least 2 unsaturated cycloacetal groups of the formula

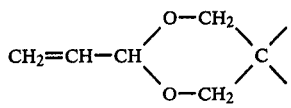

(the unsaturated dioxane type) and/or

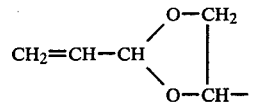

(the unsaturated dioxolane type) per molecule. Typical examples of this compound are shown in (1) to (5) below.

(1) Diallylidene pentaerythritol, triallylidene sorbitol, diallylidene-2,2,6,6-tetramethylol cyclohexane, or mixtures of these.

(2) The reaction product of (a) diallylidene pentaerythritol and/or diallylidene-2,2,6,6-tetramethylol cyclohexanone, with any of (b) to (f) below.

- (b) A polyol such as ethylene glycol, diethylene glycol, triethylene glycol, propylene glycol, dipropylene glycol, 1,3-butanediol, 1,6-hexanediol, polyethylene glycol, hydrogenated bisphenol A, bisphenol A-ethylene oxide adduct, bisphenol A-propylene oxide adduct, trimethylolpropane, trimethylolethane, pentaerythritol, dipentaerythritol, an ethylene oxide or propylene oxide adduct of phthalic acid, isophthalic acid or terephthalic acid, and a hydroxyl-terminated polyester having a molecular weight of not more than 1,500.
- (c) A polythiol, for example, dithioglycol, dipentenedimercaptan, ethylcyclohexyldimercaptan, 1,6-hexanedimercaptan, and a compound containing at least two in total of hydroxyl groups and/or mercapto groups per molecule such as an ester obtained by the reaction of thioglycollic acid, β-mercaptopropionic acid or mercaptosuccinic acid with the polyol (b).
- (d) A phenol such as phenol, cresol, and novolaks, bisphenol F and bisphenol A obtained by condensation of the above phenols with formaldehyde.
- (e) An arylsulfonamide such as benzenesulfonamide, o-toluenesulfonamide, p-toluenesulfonamide and chlorobenzenesulfonamide.
- (f) A mixture of the compounds (b) to (e) in arbitrary combinations.

(3) The reaction product of monoallylidene trimethylol-propane and/or monoallylidene trimethylolethane with an isocyanate compound such as tolylene diisocyanate, polyalkylene allyl diisocyanates, meta-phenylene diisocyanate, xylylene diisocyanate, hexamethylene diisocyanate and isophorone diisocyanate.

(4) An addition half ester of methylolpropane and/or monoallylidene trimethylolethane with a carboxylic acid anhydride such as succinic anhydride, maleic anhydride, itaconic anhydride, phthalic anhydride, tetrahydrophthalic anhydride, hexahydrophthalic anhydride or Het Acid anhydride (hexachloroendomethylenetetrahydrophthalic anhydride).

(5) A compound obtained by reacting an addition half ester of monoallylidene trimethylolpropane and/or monoallylidene trimethylolethane and a carboxylic acid anhydride, with an epoxy compound such as a polyglycidyl ether-type epoxy compound or a diglycidyl ester-type epoxy compound of phthalic acid, adipic acid, dimeric acid, etc.

The compound (B) containing at least 2 mercapto groups (HS-) per molecule is an aliphatic or aromatic polymercaptan. Specific examples include dipentenedimercaptan, ethylcyclohexyl dimercaptan, 1,6-hexanedimercaptan, an ester of a carboxyl-containing mercapto compound (e.g., thioglycollic acid, β-mercaptopropionic acid or mercaptosuccinic acid) with a polyhydric alcohol (e.g., trimethylolpropane, trimethylolethane, pentaerythritol or dipentaerythritol), a compound having a hydroxyl group at a carbon atom β to the mercapto group, a compound obtained by the reaction of an epoxy resin with hydrogen sulfide, and a compound obtained by the reaction of an epoxy resin with thioglycollic acid.

The unsaturated alcohol (C) containing a hydroxyl group and an acryloyl or methacryloyl group in the molecule which is used in this invention includes, for example, 2-hydroxyethyl acrylate, 2-hydroxypropyl acrylate, 1,6-hexanediol monoacrylate, neopentyl glycol monoacrylate, glycerol diacrylate, trimethylolpropane diacrylate, pentaerythritol triacrylate, 2-hydroxyethyl methacrylate, 2-hydroxypropyl methacrylate, glycerol dimethacrylate, trimethylolpropane dimethacrylate and pentaerythritol trimethacrylate.

The ratio between the compound (A) and the compound (B) is not particularly restricted. However, when the amount of the compound (A) is too large in comparison with the compound (B), curing of the resulting reaction product or mixture requires a long period of time, and when the amount of the compound (B) is extremely large, the cured product gives off offensive odors and has degraded properties. Preferably, therefore, the equivalent ratio of the compound (A) to the compound (B) is from 10:0.5 to 1:1.

In order to obtain a curable reaction product or mixture from the compounds (A) and (B), it is essential that the number of unsaturated cycloacetal groups in the compound (A) be at least two per molecule, and the number of mercapto groups in the compound (B) be at least two per molecule. In a particularly preferred embodiment, the total number of the unsaturated cycloacetal groups per molecule and the mercapto groups per molecule is at least 5.

Usually, the compound (A) and the unsaturated alcohol (C) are used in such amounts that the mole ratio of the former to the latter is from 1:1 to 1:2.2. When in accordance with with a preferred embodiment of this invention, diallylidene pentaerythritol is used as the compound (A) and an acid compound such as p-toluenesulfonic acid or diethyl sulfate as the catalyst, the compound (A) reacts with the unsaturated alcohol (C) to give an unsaturated spiroacetal-type oligomer. The reaction product contains the oligomer and the unreacted compound (A) and/or unsaturated alcohol (C). The reaction product is submitted to a molding step and a subsequent curing step, either as such or after the unreacted compound (A) and/or unsaturated alcohol (C) have been removed therefrom. In the present invention, the oligomer preferably has a molecular weight of 300 to 1,000, especially 400 to 600, from the standpoint of moldability and curability.

When, for example, diallylidene pentaerythritol as the compound (A) and 2-hydroxyethyl acrylate as the unsaturated alcohol (C) are used, various unsaturated spiroacetal-type oligomers containing as a main component a compound of the following formula [I] having an acryloyl group at both ends or a compound of the following formula [II] containing an acryloyl group at one end are obtained according to the proportions of the two compounds.

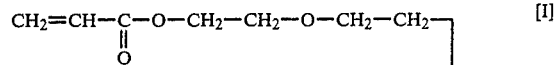

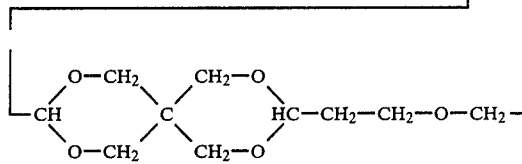

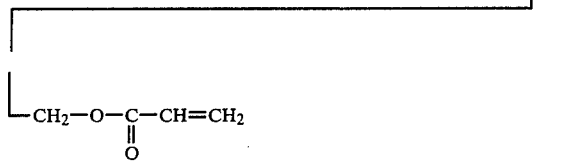

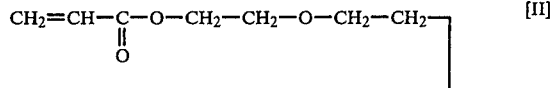

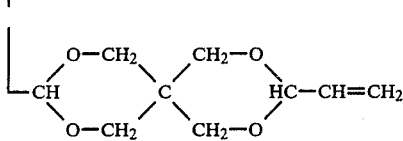

For example, in the production of an unsaturated spiroacetal-type oligomer containing the compound of formula [I] as a main component, it is preferable to use 1.8 to 2.2 moles of the unsaturated alcohol per mole of diallylidene pentaerythritol. In the production of an unsaturated spiroacetal-type oligomer containing the compound of formula [II] as a main component, it is preferred to use 1.0 to 1.2 moles the unsaturated alcohol per mole of the diallylidene pentaerythritol.

In the production of the plastic lens of this invention, at least one another reactive monomer or oligomer may, if desired, be used together with the compounds (A) and (B) or the unsaturated alcohol (C) in such an amount which does not impair the essence of the lens. The other reactive monomer or oligomer, as referred to herein, may be any monomer or oligomer which can be copolymerized with the compound (A) or (B) or the unsaturated alcohol (C) and can be uniformly mixed therewith. Examples of such other monomers or oligomers include aliphatic polyvinyl compounds such as ethylene glycol diacrylate, ethylene glycol dimethacrylate, trimethylolpropane triacrylate, trimethylolpropane trimethacrylate, pentaerythritol tetraacrylate and dipentaerythritol hexaacrylate; styrene-type monovinyl aromatic compounds such as styrene, methylstyrene, ethylstyrene and chlorostyrene; nitrogen-containing heterocyclic compounds such as vinylpyridine, 2-methyl-5-vinylpyridine and vinylpyrrolidone; aromatic polyvinyl compounds such as divinylbenzene, divinyltoluene and divinylnaphthalene; and compounds known heretofore as materials for plastic lenses, for example allyl compounds such as allyl diglycol carbonate, diallyl phthalate, triallyl cyanurate, triallyl isocyanurate, diallyl maleate and diallyl fumarate, methyl methacrylate, and epoxy acrylate. The aliphatic polyvinyl compounds and the allyl compounds are preferred from the standpoint of copolymerizability. The styrene-type monovinyl aromatic compounds and the nitrogen-containing heterocyclic compounds are preferred in improving the dyeability of lenses, but should desirably be used with other monomers.

The plastic lens of this invention may be produced by any known method, for example by introducing the reaction product or mixture of the compound (A) with compound (B) or the unsaturated alcohol (C) and optionally another monomer (the reaction product or mixture is sometimes referred to hereinbelow as a starting composition) into a mold having a specified profile designed to the profile of a final lens product and curing it to the desired profile, or by curing the starting composition to an arbitrary shape without using a specific mold and then cutting the cured product to the desired profile.

In curing the starting composition placed in a mold for plastic lens production or a mold of an arbitrary profile, acid catalysts, radical generators, active energy rays, etc. may be used singly or in combination. Examples of the acid catalysts are polyphosphoric acid, phosphoric acid, trifluoroacetic acid, p-toluenesulfonic acid, boron trifluoride complexes, and metal halides such as tin chloride or zinc chloride. The amount of the acid catalyst differs according to the curing temperature. Usually, it is 0.001 to 5 parts by weight, preferably 0.01 to 2 parts by weight, per 100 parts by weight of the starting composition. Peroxides having various decomposition temperatures may be used as the radical generators. Examples include benzoyl peroxide, azobisisobutyronitrile, methyl ethyl ketone peroxide, t-butyl hydroperoxide, di-t-butyl peroxide, and dicumyl peroxide. The amount of the radical generator is 0.01 to 5 parts by weight per 100 parts by weight of the starting composition. For curing at below 100° C., azobisisobutyronitrile is especially preferred, and its amount is preferably 0.05 to 0.5 part by weight in view of foaming. Light having a wavelength of 150 nm to 450 nm from carbon arcs, xenon lamps, mercury lamps, etc. and sunlight are utilized as the active energy rays. For practical purposes, it is preferred to use high-pressure mercury lamps in widespread use for drying paints and inks comprising unsaturated polyester resins or acrylic resins, or photopolymerization-type instantaneous paint drying devices utilizing a pulse method. When curing is to be performed by active energy rays, it is not particularly necessary to incorporate a light sensitizer in the starting composition. For widening the sensitizing area and shortening the curing time, it is preferable to use 0.01 to 10 parts by weight, per 100 parts by weight of the starting composition, of a known light sensitizer such as a ketone compound (e.g., benzoin, benzoin methyl ether, benzoin isopropyl ether, acetophenone, benzophenone or anthraquinone), a disulfide compound or a diazo compound. The use of the active energy rays is especially preferred from the standpoint of productivity.

As desired, additives such as polymerization accelerators, polymerization modifiers, anti-clouding agents and mold releasing agents may be incorporated in the starting composition.

Curing of the starting composition by heating, light radiation, ultraviolet light radiation, ionizing radiation, etc. is preferably carried out in the atmospheric air or in an inert gaseous atmosphere at a temperature of from room temperature to 150° C., particularly to 120° C.

Colored plastic lenses can be produced by using a starting composition containing a dye or a pigment, or by dyeing plastic lenses obtained from a starting composition not containing such a coloring material.

The plastic lenses in accordance with this invention are characterized by high surface hardness and excellent abrasion resistance, scratch resistance, heat resistance, chemical resistance, impact resistance, light transmission and dyeability, and very good cutting and polishing properties during processing.

The plastic lenses of the invention are useful in eyeglasses of various types, watches and clocks, cameras, industrial materials such as gas masks and welding protection masks, and optical materials such as prisms.

The following Examples illustrate the present invention more specifically.

EXAMPLE 1

Diallylidene pentaerythritol [21.2 g (0.1 mole)] was dissolved in 21.6 g (0.05 mole) of pentaerythritol tetramercaptoacetate having a purity of 95% to form a uniform solution. Then, 0.2 g of benzophenone was dissolved in the solution to form a starting composition. The starting composition was poured into a mold formed by aligning a glass sheet having a mirror surface-finished concave surface and a glass sheet having a mirror surface-finished convex surface in spaced-apart relationship and surrounding them with a polyvinyl chloride gasket. Light was irradiated onto both surfaces of the mold from 2 KW high-pressure mercury lamps disposed 15 cm away from the mold surface. The polymerization was complete in 100 seconds to give a uniformly cured transparent lens having a smooth surface.

The lens obtained had a light transmittance of 92%, a refractive index ($n_D$) of 1.54, a surface hardness of 2H (pencil hardness) and a Barcol hardness (GYE J-935) of 80, and showed excellent scratch resistance, solvent resistance, heat resistance and cutting and polishing properties.

EXAMPLE 2

A starting mixture obtained by uniformly dissolving 21.2 g (0.1 mole) of diallylidene pentaerythritol, 21.6 g (0.05 mole) of pentaerythritol tetramercaptoacetate, 10 g of trimethylolpropane triacrylate and 0.15 g of azobisisobutyronitrile was poured into the same mold as in Example 1. The mold was dipped in a hot water tank at 80° C., and 30 minutes later, the temperature of the liquid in the tank was raised at a rate of 10° C. per hour. The mold was maintained at 90° C. for 3 hours in the tank, then transferred to a constant-temperature tank at 120° C., and maintained in this condition for 2 hours to complete polymerization and curing.

The lens obtained had a light transmittance of 92%, an impact resistance (the lowest height from which a porcelain ball having a weight of 50 g was let fall and broke the lens) of 100 cm, and a surface hardness of 4H (pencil hardness). Damage was hardly caused in a scratching test using steel wool. These data account for its excellent optical properties, impact resistance and surface hardness. No change in the curvature of lens surface was observed when this lens was dipped in trichloroethylene, or heated at 100° C. for 2 hours. This therefore shows its good solvent resistance and heat resistance. Furthermore, the lens was able to be cut smoothly by a diamond wheel, showing the lens to have good excellent cutting and polishing properties.

EXAMPLE 3

Monoallylidene trimethylolethane [150 g (0.88 mole)] was reacted with 74 g (0.44 mole) of hexamethylene diisocyanate at 40° C. for 5 hours until absorption of the isocyanate at 2270 cm$^{-1}$ disappeared in infrared spectroscopy. From the presence of the urethane group in the product ascertained by infrared spectroscopy and the iodine value of the product, the resulting product was determined to be a compound of the following structure.

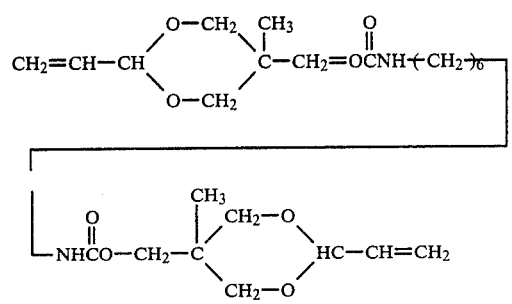

To 224 g (0.44 mole) of the compound were added 235 g (about 0.3 mole) of dipentaerythritol hexamercaptoacetate (purity 94%), 1.2 g of phosphorous acid, 130 g of ethylene glycol diacrylate and 4 g of azobisisobutyronitrile, and they were uniformly dissolved. The solution was defoamed under reduced pressure to give a starting composition. The starting composition was poured into the same mold as in Example 1, and polymerization and curing were performed under the same heating conditions as set forth in Example 2 to give a lens having a smooth surface.

The resulting lens was pale yellow in color, and had a light transmittance of 91%, a refractive index ($n_D$) of 1.56, an impact resistance of 60 cm, and a surface hardness of 6H (pencil hardness). In a scratching test using steel wool, no damage was caused to the lens. No change was noted in the lens in a solvent resistance test in trichloroethylene and a heat resistance test at 100° C.

EXAMPLE 4

A 1-liter three-necked flask equipped with a stirrer, a reflux condenser and a thermometer was charged with 212 g (1 mole) of diallylidene pentaerythritol, 216 g (0.5 mole) of pentaerythritol tetramercaptoacetate having a purity of 95%, and 1.2 g of phosphorous acid, and they were heated at 70° to 80° C. for 2 hours with stirring to give a slightly pale yellow viscous resin (prepolymer) having a viscosity of 214 poises.

Azobisisobutyronitrile (0.3 g) was added to 100 g of the prepolymer to form a uniform solution. The solution was poured into the same mold as in Example 1. The two surfaces of the mold were heated first at 60° C. for 2 hours, then at 80° C. for 2 hours, and finally at 120° C. for 4 hours to complete the reaction.

The resulting lens had a light transmittance of 92%, a refractive index ($n_D$) of 1.54, a surface hardness of 2H (pencil hardness), and a Barcol hardness (GYE J-935) of 80, and showed excellent scratch resistance, solvent resistance, heat resistance and cutting and polishing properties.

EXAMPLE 5

21.2 g (0.1 mole) of diallylidene pentaerythritol, 21.6 g (0.05 mole) of pentaerythritol tetramercaptoacetate, 20.6 g of a prepolymer obtained by reacting 1 mole of diallylidene pentaerythritol with 2 moles of 2-hydroxyethyl acrylate, 10 g of trimethylolpropane triacrylate and 0.4 g of benzoin isopropyl ether were uniformly dissolved. The solution was poured into the same mold as in Example 1. Light was irradiated onto both surfaces of the mold by 2 KW high-pressure mercury lamps disposed at a distance of 15 cm from the mold surface, and in 120 seconds, the polymerization was completed to give a uniform transparent lens having a smooth surface.

The resulting lens had a light transmittance of 92%, a refractive index of 1.52 and a surface hardness of 5H (pencil hardness) and more than 100 (Barcol hardness, GYE J-935) and exhibited excellent heat resistance and cutting and polishing properties.

EXAMPLE 6

A 1-liter three-necked flask equipped with a stirrer, a condenser and a thermometer was charged with 212 g (1 mole) of diallylidene pentaerythritol, 100 g (1 mole) of 2-hydroxyethyl acrylate, 0.6 g of hydroquinone, 1 g of phosphoric acid and 1 g of p-toluenesulfonic acid, and they were heated at 80° to 85° C. for 3 hours. It was understood that about 98% of the free hydroxyl groups disappeared as a result of this reaction. After the reaction, the reaction product was washed several times with 1% sodium hydroxide and then with distilled water, and dried completely under reduced pressure. Finally, 0.3 g of triethylamine was added to give a 1:1 adduct (to be referred to as a half adduct) of diallylidene pentaerythritol and 2-hydroxyethyl acrylate.

Diallylidene pentaerythritol 31.8 g (0.15 mole), 43.2 g (0.1 mole) of pentaerythritol tetramercaptoacetate, 15.6 g (0.05 mole) of the aforesaid half adduct, 9.4 g of trimethylolpropane triacrylate, 0.3 g of azobisisobutyronitrile and 0.3 g benzophenone were uniformly stirred to form a solution. The resulting solution was poured into the same mold as in Example 1. Light was irradiated onto both surfaces of the mold by 2 KW high-pressure mercury lamps disposed 15 cm away from the mold surface, and in 240 seconds, polymerization was completed. The product was further heated at 60° C. for 2 hours, at 80° C. for 1 hour and at 120° C. for 2 hours, all in an air bath. Thus, a uniform and transparent lens having a smooth surface was obtained.

The resulting lens had a light transmittance of 91%, a refractive index of 1.51, a surface hardness of 5H (pencil hardness) and showed excellent heat resistance and cutting and polishing properties.

EXAMPLE 7

Trimethylolpropane trimethacrylate (30 parts by weight) and 1 part by weight of benzoyl peroxide were added to 100 parts by weight of the reaction product having a molecular weight of 472, a viscosity of 3.7 poises and a Gardner color number of 1 to 2 obtained by reacting 1 mole of diallylidene pentaerythritol and 2 moles of 2-hydroxypropyl acrylate to obtain a starting composition. The starting composition was poured into the same mold as in Example 1. The mold was dipped in a hot water tank at 80° C., and 30 minutes later, the temperature of the liquid in the hot water tank was raised at a rate of 10° C. per hour to perform polymerization. The product was maintained at 90° C. for 3 hours, transferred to an electric furnace at 120° C., and maintained in this condition for 2 hours to complete the polymerization.

The resulting lens had a light transmittance of 92%, an impact strength of 60 cm, and a surface hardness of 5H (pencil hardness). Damages hardly occurred in the lens in a scratching test using steel wool. Accordingly, the lens had excellent optical properties, impact resistance and surface hardness. No change in the curvature of the lens surface was noted when it was dipped in trichloroethylene, or heated at 100° C. for 2 hours. This result accounts for its excellent solvent resistance and heat resistance. Furthermore, this lens showed excellent cutting and polishing properties in cutting it with a diamond wheel as in Example 1.

EXAMPLE 8

Pentaerythritol tetraacrylate (30 parts by weight) and 1 part by weight of t-butyl perbenzoate were added to 100 parts by weight of the same reaction product as in Example 7 to form a starting composition. The starting composition was polymerized in the same way as in Example 7 to form a lens having a smooth surface.

The resulting lens had a light transmittance of 92%, an impact resistance of 43 cm, a surface hardness of 6H (pencil hardness), and exhibited excellent scratch resistance, solvent resistance, heat resistance and cutting and polishing properties.

EXAMPLE 9

One part by weight of benzophenone and 1 part by weight of dimethylaminoethanol were added to 100 parts by weight of the reaction product having a molecular weight of 444, a viscosity of 4.4 poises and a Gardner color number of 1 to 2 which was obtained by reacting 1 mole of diallylidene pentaerythritol and 2 moles of 2-hydroxyethyl acrylate to form a starting composition. The starting composition was poured into the same mold as in Example 1, and ultraviolet light was irradiated onto both surfaces of the mold by 2 KW high-pressure mercury lamps disposed 10 cm away from the mold surface to perform polymerization. In 20 minutes, the polymerization was completed to give a lens having a smooth surface.

The resulting lens had a light transmittance of 90% and an impact resistance of 60 cm, and exhibited excellent surface hardness, scratch resistance, solvent resistance, heat resistance, and cutting and polishing properties.

EXAMPLE 10

Ethylene glycol diacrylate (50 parts by weight), 1.5 parts by weight of benzophenone, 1.5 parts by weight of dimethylaminoethanol and 0.1 part by weight of Air Roll op (tradename) as a mold releasing agent were added to 100 parts by weight of the same reaction product as in Example 9 to form a starting composition. The starting composition was polymerized in the same way as in Example 9 to give a lens having a smooth surface.

The resulting lens had a light transmittance of 90%, an impact resistance of 38 cm and a surface hardness of 4H, and exhibited excellent scratch resistance, solvent resistance, heat resistance and cutting and polishing properties.

EXAMPLE 11

Five parts by weight of vinylpyridine, 1 part by weight of benzophenone and 1 part by weight of dimethylaminoethanol were added to 100 parts by weight of the same reaction product as in Example 9 to form a starting composition. The starting composition was polymerized in the same way as in Example 9 to a give a lens having a smooth surface.

The resulting lens had a light trnasmittance of 92% and an impact resistance of 54 cm, and exhibited excellent surface hardness, scratch resistance, solvent resistance, heat resistance and cutting and polishing properties.

When this lens was dyed for 2 minutes at 70° C. in a 5% acetic acid solution of a green or pale blue acid dye (dye concentration 20%), the lens showed good dyeability in either case.

EXAMPLE 12

Diallylidene pentaerythritol [21.2 g (0.1 mole)], 21.6 g (0.05 mole) of pentaerythritol tetramercaptoacetate, 28 g of dipentaerythritol hexaacrylate and 0.2 g of azobisisobutyronitrile were uniformly dissolved. The resulting solution was poured into the same mold as in Example 1. The mold was dipped in a hot water tank at 80° C. Thirty minutes later, the temperature of the liquid in the hot water tank was raised at a rate of 10° C. per hour, and the mold was maintained at 90° C. for 3 hours. Then, it was transferred to a constant-temperature tank at 120° C., and maintained in this condition for 2 hours to complete polymerization and curing of the composition.

The resulting lens had a light transmittance of 92%, an impact resistance of 90 cm, and a surface hardness of 6H (pencil hardness), and no damage was caused to the lens in a scratchig test using steel wool.

What we claim is:

1. A plastic lens composed of a cured product of a mixture or a reaction product of (A) a compound containing at least two unsaturated cycloacetal groups per molecule, (B) a compound containing at least two mercapto groups per molecule and (D) an aliphatic polyvinyl compound selected from the group consisting of ethylene glycol diacrylate, ethylene glycol dimethacrylate, trimethylolpropane triacrylate, trimethylolpropane trimethacrylate, pentaerythritol tetraacrylate and dipentaerythritol hexaacrylate.

2. The plastic lens of claim 1 wherein the mixture or the reaction product is prepared from the compounds (A), (B) and (D) in an equivalent ratio of 1:1 to 2.05:0.32 to 1.75.

* * * * *